United States Patent
Brown (10) Patent No.: US 12,521,608 B2
(45) Date of Patent: Jan. 13, 2026

(54) COMBINATION ROPE ASCENDER AND PULLEY

(71) Applicant: International Safety Components Ltd, Gwynedd (GB)

(72) Inventor: Kevin Brown, Gwynedd (GB)

(73) Assignee: INTERNATIONAL SAFETY COMPONENTS LIMITED, Gwynedd (GB)

( * ) Notice: Subject to any disclaimer, the term of this patent is extended or adjusted under 35 U.S.C. 154(b) by 865 days.

(21) Appl. No.: 17/768,628

(22) PCT Filed: Oct. 27, 2020

(86) PCT No.: PCT/GB2020/000089
§ 371 (c)(1),
(2) Date: Apr. 13, 2022

(87) PCT Pub. No.: WO2021/084215
PCT Pub. Date: May 6, 2021

(65) Prior Publication Data
US 2024/0042282 A1    Feb. 8, 2024

(30) Foreign Application Priority Data

Oct. 29, 2019   (GB) ..................... 1915678

(51) Int. Cl.
*A63B 29/02*    (2006.01)
*A62B 1/10*     (2006.01)
(Continued)

(52) U.S. Cl.
CPC ............. *A63B 29/02* (2013.01); *A62B 1/10* (2013.01); *A62B 1/14* (2013.01); *B66D 3/046* (2013.01); *F16G 11/106* (2013.01)

(58) Field of Classification Search
CPC ........... A63B 29/02; A63B 27/00; A62B 1/10; A62B 1/14; A62B 1/08; B66D 3/046; B66D 3/04; F16G 11/106
See application file for complete search history.

(56) References Cited

U.S. PATENT DOCUMENTS

| 686,154 A | * | 11/1901 | Smith | ..................... B66D 3/046 |
| | | | | 254/406 |
| 2,374,118 A | | 4/1945 | Moore, Jr. | |

(Continued)

FOREIGN PATENT DOCUMENTS

| CN | 206088873 U | 4/2017 |
| FR | 2339566 A1 * | 8/1977 |

(Continued)

*Primary Examiner* — Ko H Chan
(74) *Attorney, Agent, or Firm* — Dickinson Wright PLLC; Andrew D. Dorisio (57) ABSTRACT

A combination climbing apparatus (1) comprising or including a rope ascender (5) and a pulley block (6), the rope ascender having front (19) and rear (21) plates disposed in generally parallel relationship, a first swivel pin (11) being received within co-axial bores in the front and rear plates, about which pin the plates are swivelable with respect to each other, a cam lever (9) mounted on the first swivel pin between the front and rear plates, the cam lever being connected, directly or indirectly, to a climbing rope braking surface (10) on a cam between the front and rear plates, the cam lever being operable to trap the rope against the cam braking surface, the front and rear plates each including a second bore (22,23) remote from the major axis of the first swivel pin for receiving a second, removable, swivel pin (29), a pulley block releasably the ascender and pulley block may be selectively used in combination when required or separately when not. The invention also extends in a second (Continued)

aspect to a pulley block for use in a combination climbing apparatus according to the first aspect of the invention, or separately.

8 Claims, 6 Drawing Sheets

(51) Int. Cl.
*A62B 1/14* (2006.01)
*B66D 3/04* (2006.01)
*F16G 11/10* (2006.01)

(56) References Cited

U.S. PATENT DOCUMENTS

| | | |
|---|---|---|
| 2,449,703 A | 9/1948 | Johnson |
| 3,112,816 A * | 12/1963 | Halford ............... B66D 3/10 |
| | | 188/65.2 |
| 4,253,218 A | 3/1981 | Gibbs |
| 5,400,869 A * | 3/1995 | Rocourt ............... A62B 1/14 |
| | | 182/5 |
| 8,733,739 B2 | 5/2014 | Mauthner et al. |
| 9,617,128 B2 * | 4/2017 | Maurice ............... B66D 3/02 |
| 10,035,028 B1 * | 7/2018 | Siegel ................. A62B 1/06 |
| 10,995,842 B1 * | 5/2021 | Siemer, Jr. ........... F16H 55/52 |
| 2007/0151802 A1 | 7/2007 | Tillitski et al. |
| 2014/0138191 A1 * | 5/2014 | Chabod ............... A62B 1/14 |
| | | 188/65.1 |
| 2015/0183624 A1 * | 7/2015 | Maurice ............... B66D 3/02 |
| | | 254/399 |

FOREIGN PATENT DOCUMENTS

| | | |
|---|---|---|
| GB | 2169868 A | 7/1986 |
| WO | 2014103271 A1 | 7/2014 |

* cited by examiner

COMBINATION ROPE ASCENDER AND PULLEY

This invention relates to climbing apparatus of the type in which climbing rope is used by climbers wearing climbing harnesses to ascend or descend fixed objects such as trees and vertical rock faces.

BACKGROUND OF THE INVENTION

A climbing apparatus of the foregoing type typically includes a device known as an ascender slidably fixed to a climbing rope in a position above the climber, the ascender incorporating a locking or braking cam mechanism used to grip the rope above the climber for providing a temporary rope anchor while the climber moves or is hauled up the rope to a position immediately below the ascender and is then temporarily locked in that position, whereafter the ascender is disengaged from the rope and pushed or slid upwards to a higher position, the process continuing until the climber has reached a required height. As will be appreciated, the effort required to move the climber in the upward direction is proportional to the weight of the climber and any equipment being carried. For this reason it is common practice for climbers to use a pulley block separately secured above the climber below another pulley block providing a mechanical advantage by which a secondary rope can be used to haul the climber and/or equipment upwards during the climb.

An improvement to the foregoing arrangement is a, combination ascender and pulley wheel as described in U.S. Pat. No. 8,733,739 ("D1") which optionally allows a separate pulley block to be used in combination with the ascender to provide a mechanical advantage for lifting the climber, the pulley wheel itself being fixed to a rear plate of the ascender remote from its braking mechanism rather than being incorporated within a separate pulley block. However, a disadvantage of this arrangement is that the presence of the integral pulley block adds weight to the ascender and unless it is used with a separate pulley block to collectively provide a mechanical advantage for the climber, the extra weight and size of the pulley block represents an unnecessary impediment to the climber. In addition, the fixed position of the pulley block immediately adjacent to the ascender is somewhat cramped and limits the use of the pulley when carrying bulky loads which may interfere with the body of the climber when being hauled The present invention is derived from the realisation that the advantages of the combination ascender and pulley wheel as described in D1 need not require them both to be in fixed relationship to each other as part of the same piece of climbing apparatus and that the disadvantages of doing so can be overcome by adopting an alternative approach.

SUMMARY OF INVENTION

According to a first aspect of the invention there is provided a combination climbing apparatus comprising or including a rope ascender and a pulley block, the rope ascender having front and rear plates disposed in generally parallel relationship, a first swivel pin being received within co-axial bores in the front and rear plates of the ascender, about which pin the plates are swivelable with respect to each other, a cam lever mounted on the first swivel pin between the front and rear plates, the cam lever being connected, directly or indirectly, to a climbing rope braking surface between the front and rear plates, the cam lever being operable to trap the rope against the cam braking surface, the front and rear plates of the ascender each including a second bore remote from the major axis of the first swivel pin for receiving a second, removable, swivel pin, a pulley block releasably secured to the ascender via the second swivel pin, the pulley block having front and rear plates between which is a pulley wheel rotatably mounted on a third swivel pin acting as an axle for the pulley wheel, the arrangement being such that the ascender and pulley block may be selectively used in combination when required or separately when not.

With this arrangement, the climber may choose to use the pulley block when connected to the rope ascender with another pulley block below the rope ascender in the manner as described in D1 for providing a mechanical advantage during climbing or, where only the rope ascender is required during the climb, the climber may simply detach the pulley block therefrom, which may then be available if required for other use during the climb, for example, hauling equipment remote from the climber.

Conveniently, one of the pair of pulley block front and rear plates is rotatable with respect to the other whereby to allow, in use, access for a climbing rope therebetween, and at least one of the front and rear plates includes locking means such that, upon alignment of such plates with respect to each other, they are releasably locked together to prevent escape of the rope from the pulley block.

Preferably, the locking means for the pulley block includes a locking formation on the front plate in the form of a yoke co-operable with a resiliently biased locking pin extending co-axially from the second, removable, swivel pin whereby to releasably capture the yoke such that the front and rear plates of the pulley block are releasably locked together. With such an arrangement, part of the pulley block front plate can be stepped to form a tang in the region of the yoke, thereby allowing it to be rotated about the pulley wheel axis to a position over and beyond the free end of the locking pin, which locking pin may conveniently be sloped at its free end, allowing the tang to automatically compress the locking pin against the spring bias when the pulley block is being closed after initial placement of a rope onto the pulley wheel.

Conveniently, the second swivel pin includes a locking formation, such as a circular groove or flange near its free end, co-operable with the yoke, whereby to releasably lock the yoke to the second swivel pin to thereby capture a climbing rope installed on the pulley block.

The invention also extends in a second aspect to a pulley block for use in combination with the ascender of the first aspect of the invention or separately, the pulley block comprising a pair of front and rear plates between which is located a pulley wheel rotatably mounted on a pulley wheel axle connected at respective ends to the front and rear plates, a removable swivel pin remote from the pulley wheel axle extending between the front and rear plates, the removable swivel pin allowing releasable connection of the pulley block to a required anchor point, such as a rope ascender or a carabiner, the free end of the removable swivel pin being releasably engageable with locking means on or in one of the front or rear plates whereby to allow, in use, access by a rope therebetween such that upon alignment thereafter of the plates with respect to each other they collectively prevent escape of the rope from the pulley block.

Conveniently, the locking means for the pulley block includes a locking formation on or in one of the front or rear plates in the form of a yoke co-operable with a yoke capture formation on or in the releasable swivel pin to releasably capture the yoke such that the front and rear plates of the pulley block are releasably locked together. The yoke capture formation on the releasable swivel pin may conveniently be in the form of a circular groove or flange extending around the pin at or near its free end. The removable swivel pin may also include a resiliently biased locking pin extending coaxially therefrom, the locking pin being biased to its extended position by spring means, such as a helically-wound spring. With such an arrangement, the free end of the locking pin is preferably at least partially sloped whereby to easily permit rotation thereover of the front plate, which may conveniently include a stepped-formation, such as a tang, co-operable with the locking pin during initial loading of the pulley block with a climbing rope, the free end of the locking pin returning to its fully extended position thereafter. The sloped free end of the locking pin therefore permits automatic axially inward compression of the pin by the stepped formation or tang during the process of assembling a rope onto the pulley wheel, the arrangement being such that upon rotation of the tang beyond the major axis of the locking pin, the latter extends back to its original position to lock the plates to a position aligned with respect to each other.

BRIEF DESCRIPTION OF THE DRAWINGS

The invention in each of its aspects will now be described, by way of example only, with reference to the accompanying drawings in which.

DETAILED DESCRIPTION OF THE DRAWINGS

Figure 1:
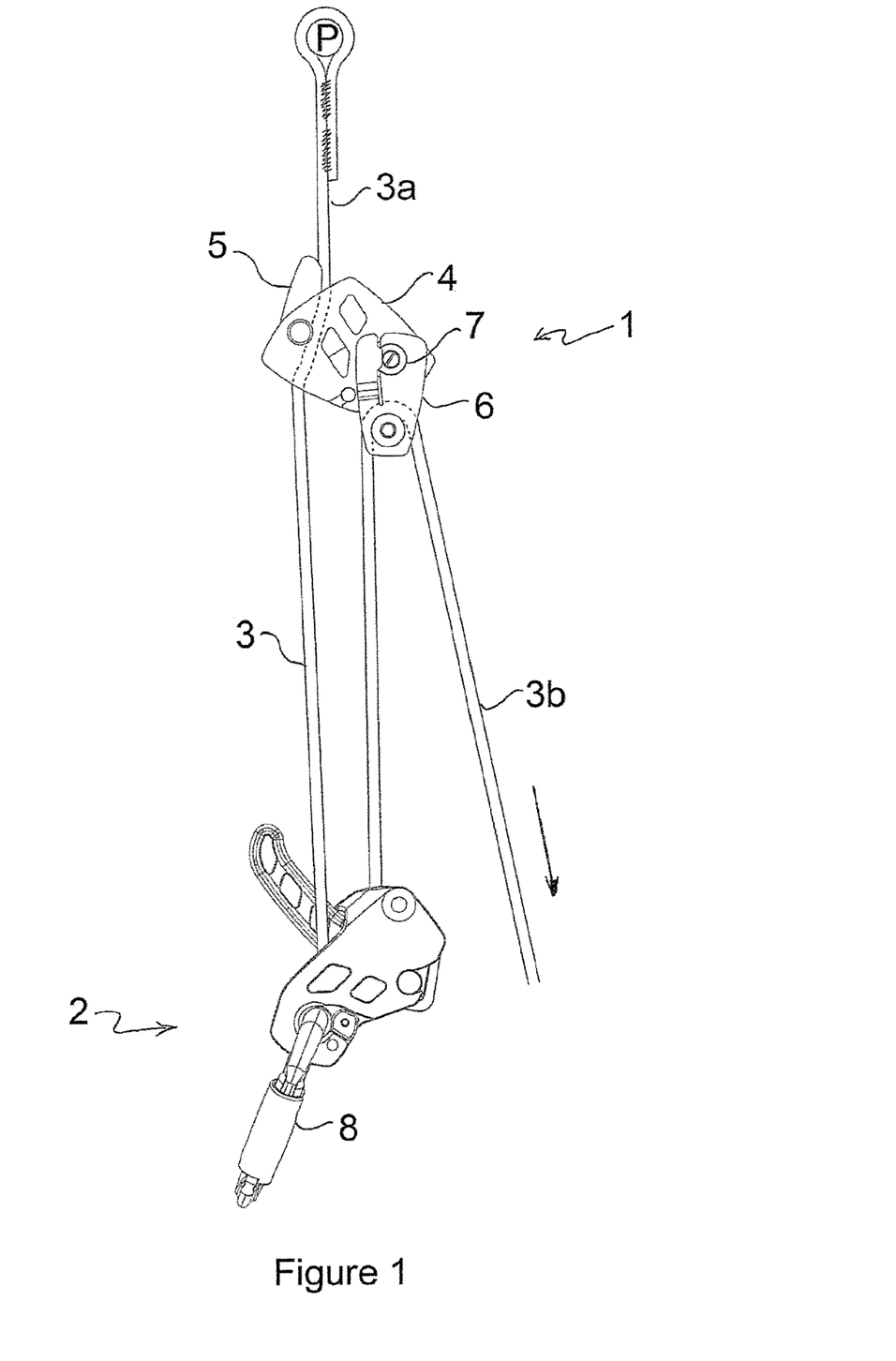
FIG. 1 shows a combination rope ascender and pulley block apparatus according to the invention rigged for use above a conventional rope descender.

Referring firstly to FIG. 1 there is shown a combination climbing apparatus 1 in the form of a rope ascender and pulley block rigged to a rope descender 2 via a climbing rope 3 secured at its upper end 3a to an anchor point "P", such as a carabiner, the rope 3 having a trailing end 3b. The combination apparatus 1 of the invention comprises a rope ascender 4 and associated actuating lever 5, the ascender also including a rope-engaging cam (not shown) for temporarily locking the ascender 4 to the rope 3. The combination apparatus 1 also includes a pulley block 6 swivelably connected to the ascender 4 by a removable swivel pin 7. Below the descender 2 is a carabiner 8 for connection to a load to be lifted, such as the harness of a climber (not shown).

In the condition shown in FIG. 1, when the trailing end 3b is pulled by the climber in the direction of the arrow it causes the descender 2 and associated carabiner 8 to be raised towards the combination apparatus 1 and upon reaching a required position the descender 2 can then be temporarily locked against the rope 3, thereby allowing the rope ascender 4 to be temporarily released from locking engagement with the rope 3, thereby allowing the combination apparatus 1 to be moved upwards to a new position towards the upper end 3a of the rope 3 where it can again be temporarily locked against the rope 3, the sequence continuing until the climb is complete.

As will be apparent to those skilled in the art, the provision of the pulley block 6 as part of the climbing apparatus 1 provides the climber with an advantage by making it easier to lift heavy loads, such as a climber and attendant climbing equipment or supplies. However, as will also be apparent, the ability for the pulley block 6 to be disconnected from the ascender 4 when not required, or where the pulley block 6 is to be located elsewhere while still being used during the climb provides a climber with a useful option which may even include not using the pulley block 6 at all where the load to be lifted by the climber is relatively light and does not require the use of a pulley block, thereby avoiding unnecessary weight, or using the pulley block at a position spaced from the ascender 4, such as when hauling large items which might otherwise interfere with the climber if the pulley block were left disposed adjacent the ascender.

Figure 2:
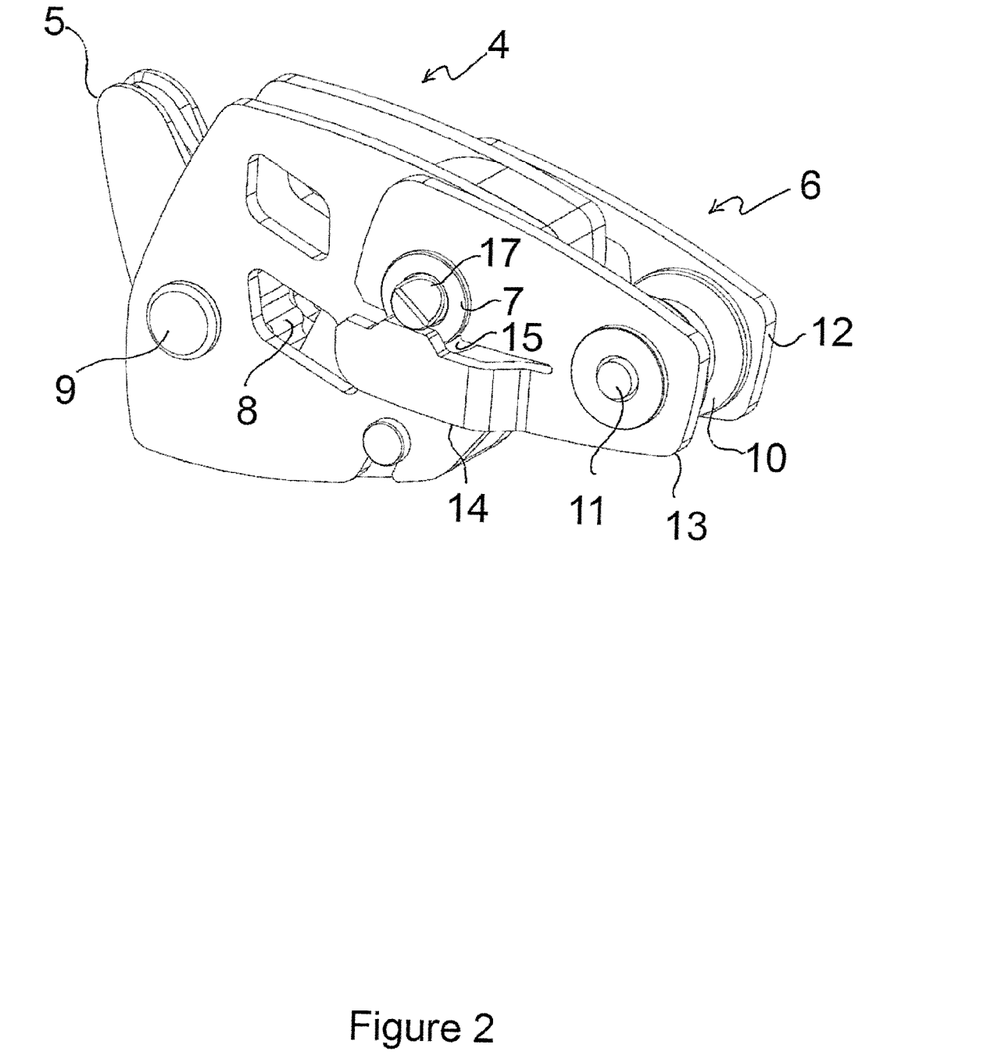
FIG. 2 is a perspective view of the combination apparatus of FIG. 1.

FIG. 2 shows a perspective view of the combination apparatus 1 in which the ascender 4 and pulley block 6 are swivelably connected together by the removable, swivel pin 7. The actuating lever 5 includes a toothed locking cam 8 engageable in use with the rope 3 (not shown), the actuating lever 5 being swivelable about a first, fixed, swivel pin 9. The pulley block 6 includes a pulley wheel or sheave 10 rotatable about a second, fixed, swivel pin 11 acting as an axle for the pulley wheel. The pulley block 6 includes a rear plate 12 and a front plate 13 swivelable with respect to each other about the second swivel pin 11. The front plate 13 includes a stepped tang 14 by which to permit rotation of the front plate 13 over the free end of the removable swivel pin 7 and a respective capture yoke 15 with which to releasably engage and capture a locking formation in the form of a circular groove 16 (shown in FIG. 6) near the free end of the removable swivel pin 7.

Figure 6:
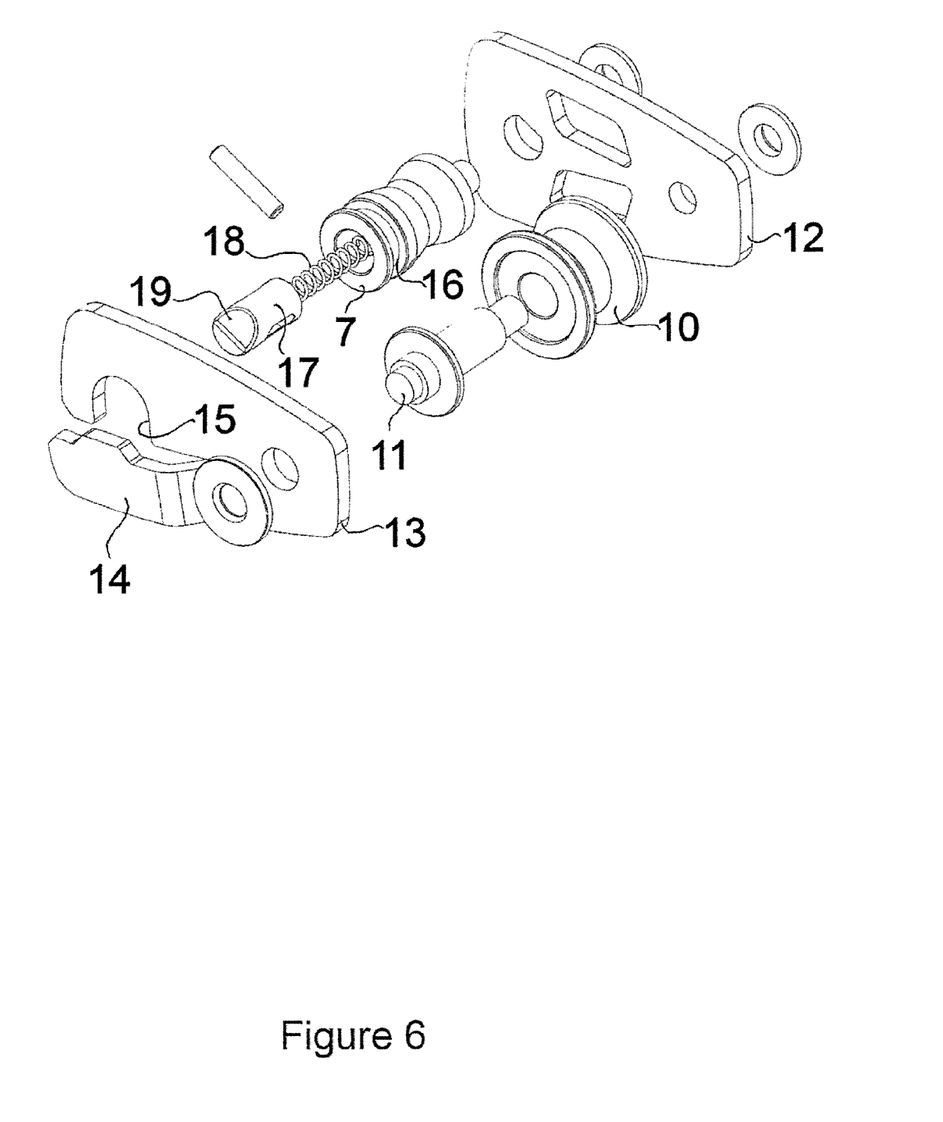
FIG. 6 is an exploded view of the pulley block of FIG. 4.

As seen more clearly with reference to FIG. 6, extending coaxially from the removable swivel pin 7 is a locking pin 17 resiliently biased to its extended position by a helically wound spring 18, the free end of the locking pin having a partially sloped surface 19 slidably engageable with the tang 14 on the front plate 13 whereby to permit the latter to be easily rotated beyond the locking pin 17 about the axis of the second fixed swivel pin 11 without the climber separately having to depress the end of the locking pin 17, whereafter the locking pin 17 automatically returns to its fully extended condition, thereby preventing rotation of the front plate 13 in the opposite direction.

Figure 3:
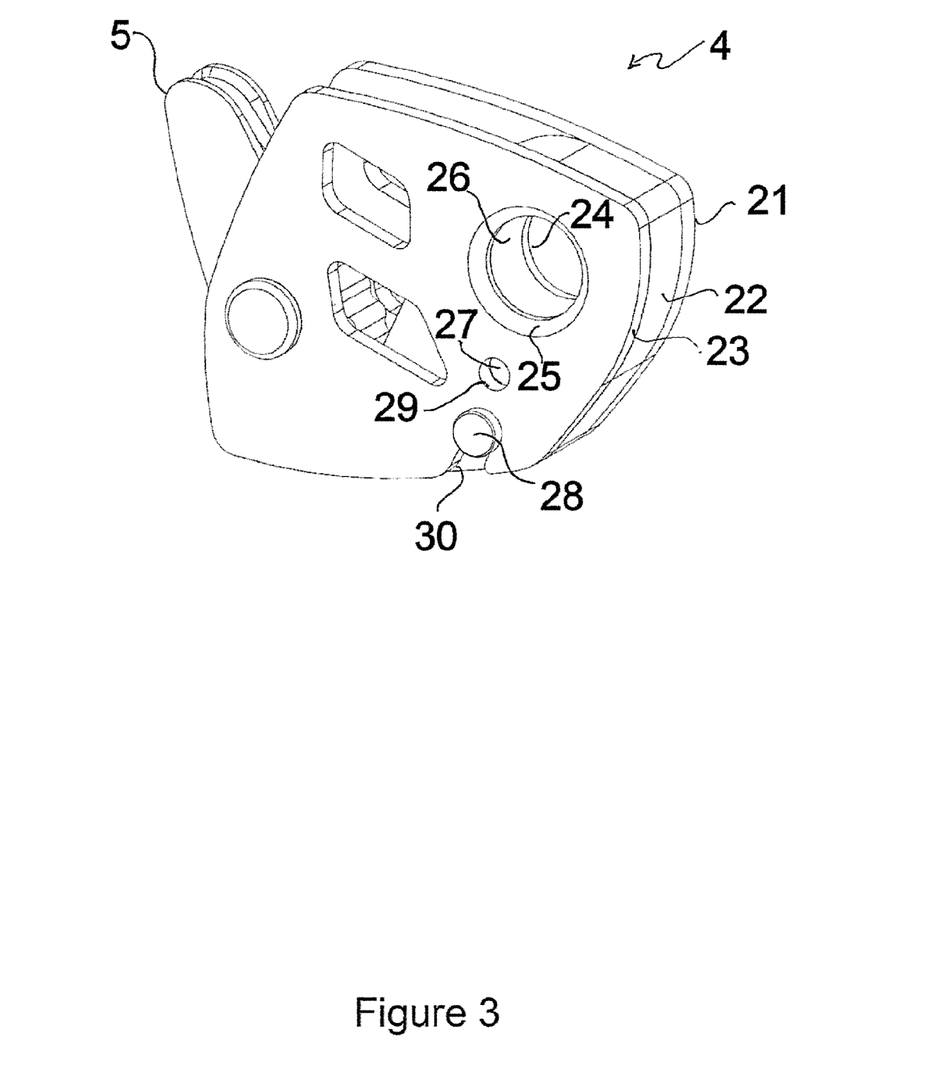
FIG. 3 is a perspective view of the rope ascender of FIG. 1 in its detached condition.
Figure 5:
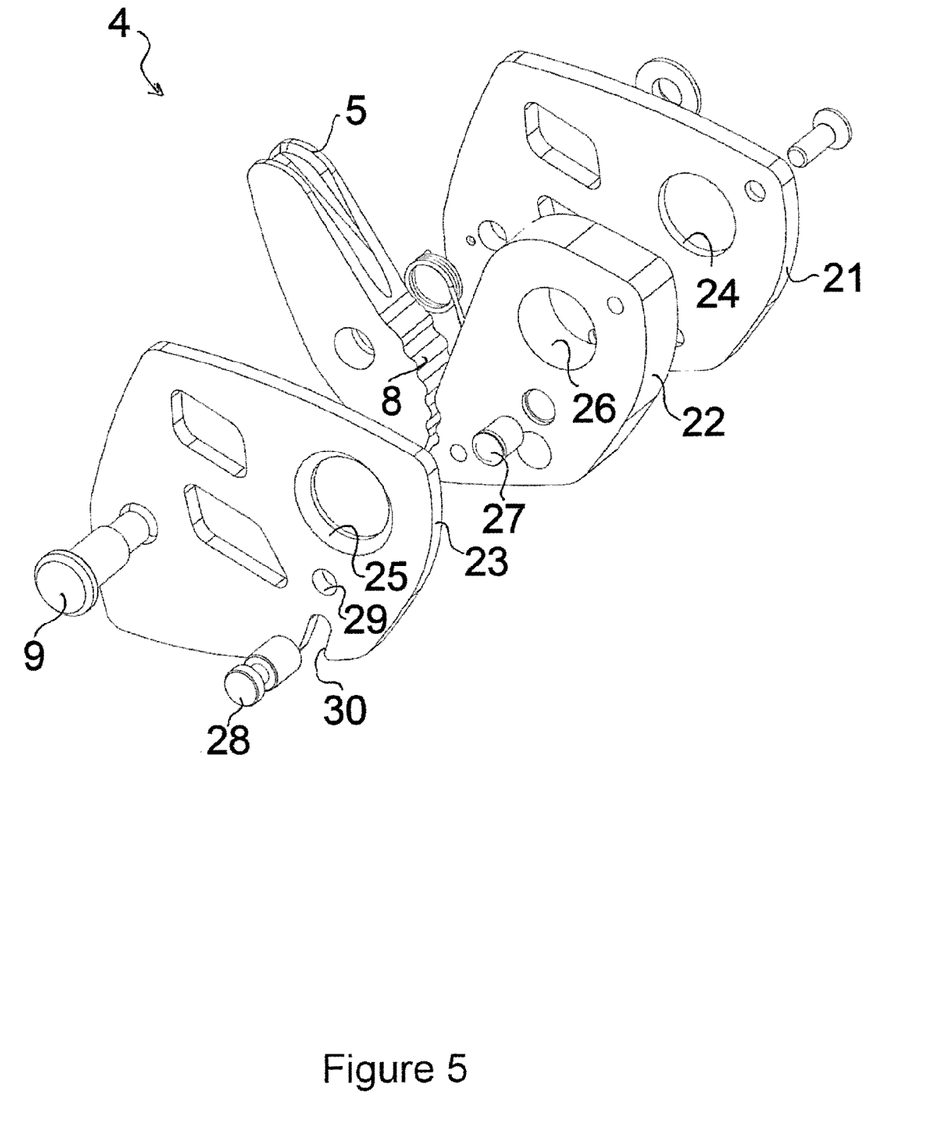
FIG. 5 is an exploded view of the ascender of FIG. 3.

FIGS. 3 and 5 respectively show perspective and exploded views of the ascender 4 alone, which comprises an ascender rear plate 21 onto which is fixed a spacer block 22 over which is rotatably mounted an ascender front plate 23, each of the rear and front plates 21, 23 having respectively co-axial bores 24, 25 for receiving the removable swivel pin 7 (not shown). The spacer block 22 includes a main bore 26 coaxial with bore 24 in the rear plate 21 and coaxial, in use, with the front plate bore 25. Extending from the spacer block 22 is a spring-biased detente ball 27 and a stop member in the form of a mushroom-headed post 28. The front plate 23 is provided with a détente-ball receiving bore 29 and a stop-member engaging yoke 30 by which to, respectively, engage and temporarily lock the front plate 23 such that its bore 25 is coaxial with bores 24 and 26.

In operation, the ascender 4 can be used as a stand-alone item of climbing equipment which also includes co-axial bores 24, 25 and 26 for connection, if required, to another item of climbing equipment, such as a carabiner.

Figure 4:
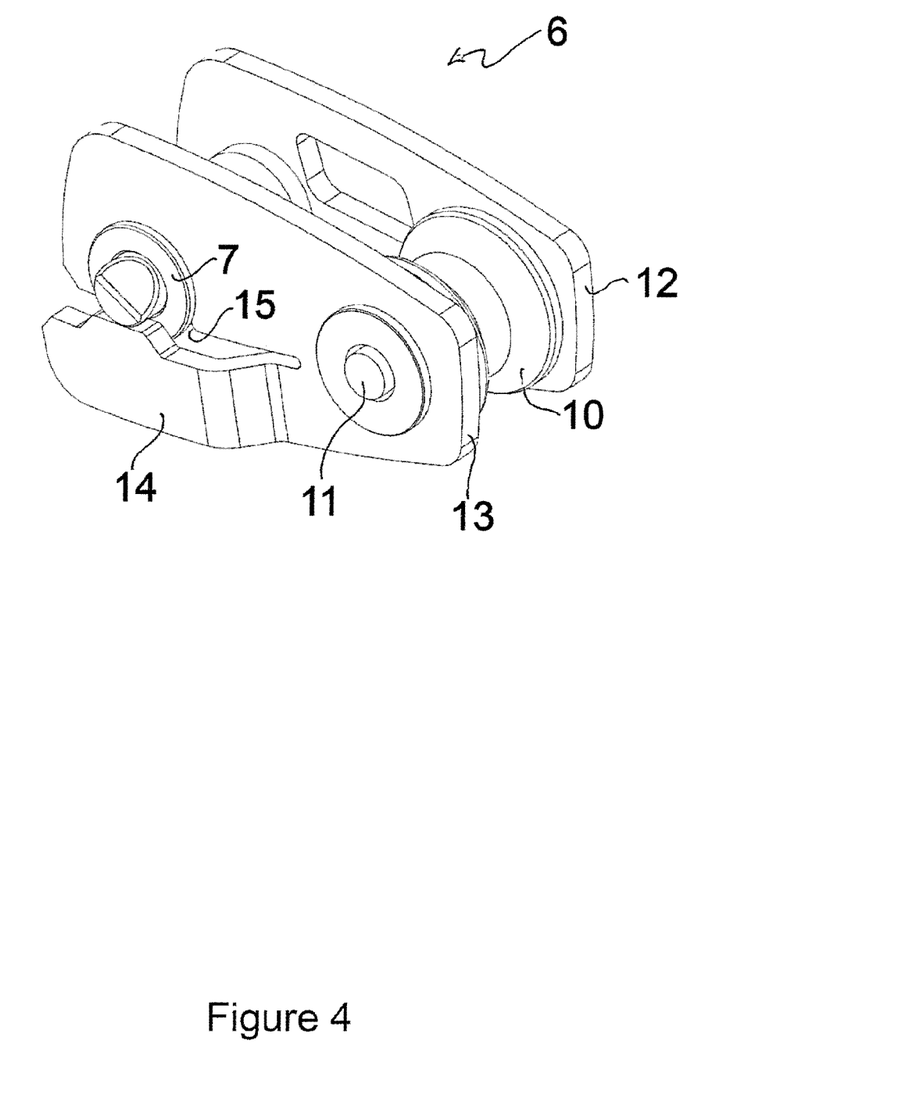
FIG. 4 is a perspective view of the pulley block of FIG. 1 in its detached condition.

FIGS. 4 and 6 respectively show perspective and exploded views of the pulley block 6 along with the removable swivel pin 7, with its circular groove 16 (shown in FIG. 6) for receiving the yoke 15 in the front plate 13, thereby limiting anti-clockwise movement of the front plate 13. In order to prevent unwanted clockwise movement of the front plate 13 there is a stop member in the form of a stepped tang 14 adapted to abut the spring-loaded locking pin 17 coaxial with and extending from the end of the removable swivel pin 7. The locking pin 17 has a partially sloped free end 19 in order to permit smoothly sliding motion thereover of the stepped tang 14—when engaged or disengaged therewith. Accordingly, in order to provide clockwise movement of the front plate 13 the sloped end 19 of the locking pin 17 is depressed against the bias of a spring 18 (shown in FIG. 6) by an amount sufficient to allow swiveling movement of the front plate 13 and associated tang 14 in a clockwise direction, thereby permitting placement or removal of climbing rope 3 (not shown) onto the pulley block 10, the front plate 13 being swivelled thereafter in the opposite direction to capture the climbing rope 3.

In operation, the pulley block 6 can therefore be used as a stand-alone item of climbing equipment or in combination with the ascender 4 if required when connected thereto by the removable swivel pin 7.

From the foregoing, it will be apparent that the invention therefore provides a dual-purpose climbing apparatus 1 which can be used in combination in the manner as shown in D1, or separately, such that when the pulley block 6 is not required it can simply be detached from the ascender 4 along with the removable swivel pin 7, or by retaining the swivel pin 7 on the ascender 4 for use with other climbing equipment. When detached, the pulley block 6 is therefore available for other purposes if needed during the climb. These may include lifting large items from an anchor point remote from the ascender whilst still being within reach of the climber, without risk of the item becoming snagged against the climber during its ascent. The invention therefore provides an elegantly simple arrangement providing the climber with useful options that would otherwise be unavailable, while retaining the advantages of combining an ascender with a pulley block when required.

The invention claimed is:

1. A combination climbing apparatus (1) comprising:
a rope ascender (4) and a pulley block (6), the rope ascender having front and rear plates (23,21) disposed in generally parallel relationship, a first swivel pin (9) being received within co-axial bores in the front and rear plates of the ascender, wherein the front and rear plates (23,21) are swivelable around the first swivel pin (9) with respect to each other, a cam lever (5) mounted on the first swivel pin between the front and rear plates, the cam lever being connected, directly or indirectly, to a climbing rope braking surface (8) between the front and rear plates, the cam lever being operable to trap a rope (3) against the climbing rope braking surface, the front and rear plates of the ascender each including a second bore (24,25) remote from the major axis of the first swivel pin (9) for receiving a second, removable, swivel pin (7), a pulley block (6) releasably secured to the ascender (4) via the second swivel pin, the pulley block having front and rear plates (13,12) between which is a pulley wheel (10) rotatably mounted on a third swivel pin (11) acting as an axle for the pulley wheel, the arrangement being such that the ascender and pulley block may be selectively used in combination when required or separately when not.

2. The climbing apparatus according to claim 1 wherein one of the pair of pulley block front (13) and rear (12) plates is rotatable with respect to the other whereby to allow, in use, access by the rope (3) therebetween.

3. The climbing apparatus according to claim 2 wherein at least one of the plates (12,13) of the pulley block includes locking means (14,15,16,17) such that, upon alignment of the pulley block plates with respect to each other, they are releasably locked together to prevent escape of the rope from the pulley block.

4. The climbing apparatus according to claim 3 wherein the locking means for the pulley block includes a locking formation on or in one of the front or rear plates of the pulley block in the form of a yoke (15) co-operable with a yoke capture formation on or in the removable swivel pin (7) whereby to releasably capture the yoke such that the front (13) and rear (12) plates of the pulley block are releasably locked together.

5. The climbing apparatus according to claim 4 wherein the yoke capture formation is in the form of a circular groove (16) extending around the major axis of the second, removable, swivel pin (7).

6. The climbing apparatus according to claim 5 wherein a resiliently biased locking pin (17) extends from the second swivel pin (7) and is biased to its extended position by a spring (18) within the removable swivel pin (7) co-operable with the stepped formation (14) in the form of a tang slideable over the free end (19) of the locking pin (17) to reach a locked position.

7. The climbing apparatus according to claim 6 wherein the free end (19) of the locking pin (17) is sloped (19).

8. A combination climbing apparatus (1) comprising:
a rope ascender (4), the rope ascender (4) comprising front and rear plates (23,21) and a locking mechanism (8) for gripping a rope (3) to provide a temporary rope anchor, wherein the front and rear plates (23,21) of the rope ascender (4) each include a first bore (24,25) for receiving a removable swivel pin (7); and
a pulley block (6), the pulley block (6) releasably secured to the rope ascender (4) via the removable swivel pin (7), the pulley block (6) comprising front and rear plates (13,12) between which a pulley wheel (10) is mounted,
wherein the rope ascender (4) and the pulley block (6) may be selectively used in combination when required or separately when not.

\* \* \* \* \*